United States Patent [19]
Ue

[11] Patent Number: 5,850,038
[45] Date of Patent: Dec. 15, 1998

[54] SCANNING PROBE MICROSCOPE INCORPORATING AN OPTICAL MICROSCOPE

[75] Inventor: Yoshihiro Ue, Hachioji, Japan

[73] Assignee: Olympus Optical Co., Ltd., Tokyo, Japan

[21] Appl. No.: 763,216

[22] Filed: Dec. 10, 1996

[30] Foreign Application Priority Data

Dec. 14, 1995 [JP] Japan .................................. 7-325831

[51] Int. Cl.⁶ .................................................. G01B 11/30
[52] U.S. Cl. ............................................ 73/105; 250/306
[58] Field of Search ............................. 73/105; 250/306, 250/307

[56] References Cited

U.S. PATENT DOCUMENTS

| | | | |
|---|---|---|---|
| Re. 33,387 | 10/1990 | Binnig ..................................... | 250/306 |
| 5,142,145 | 8/1992 | Yasutake ................................. | 250/306 |
| 5,260,824 | 11/1993 | Okada et al. .......................... | 73/105 X |
| 5,291,775 | 3/1994 | Gamble et al. ........................... | 73/105 |
| 5,298,975 | 3/1994 | Khoury et al. ......................... | 73/105 X |
| 5,317,153 | 5/1994 | Matsuhiro et al. ..................... | 73/105 X |
| 5,394,741 | 3/1995 | Kajimura et al. ......................... | 73/105 |
| 5,406,833 | 4/1995 | Yamamoto ................................ | 73/105 |
| 5,448,399 | 9/1995 | Park et al. ................................ | 359/372 |
| 5,463,897 | 11/1995 | Proter et al. .............................. | 73/105 |
| 5,675,145 | 10/1997 | Toda et al. ........................... | 250/306 X |
| 5,675,154 | 10/1997 | Lindsay et al. ..................... | 250/306 X |
| 5,689,063 | 11/1997 | Fujiu et al. ............................... | 73/105 |

OTHER PUBLICATIONS

Ultramicroscopy 42–44; 1992; pp. 1542–1548; North–Holland, R. Kaneko; S. Oguchi; S. Hara et al; "Atomic Force Microscope Coupled With An Optical Microscope", pub. 1992 month not given.

*Patent Abstracts of Europe* (WO 08901603A1) Feb. 23, 1989 "Scanning Type Tunnel Microscope" Chiaki Sato et al.

*Patent Abstracts of Europe* (EP 00640829A2) Mar. 1, 1995 "Scanning Probe Microscope" Chiaki Sato et al.

*Patent Abstracts of Japan* (07–174768) Jul. 14, 1995 "Scanning Type Probe Microscope" Akitoshi Toda.

*Patent Abstracts of Japan* (08–304420) Nov. 22, 1996 "Scanning Probe Microscope and Optical Microscope" Toshio Ando et al.

*Primary Examiner*—Thomas P. Noland
*Attorney, Agent, or Firm*—Frishauf, Holtz, Goodman, Langer & Chick

[57] ABSTRACT

A scanning probe microscope includes a unit for an SPM measurement on a sample and an optical system for observation of at least the sample. The SPM measurement unit includes a cantilever having a probe on its free end and a detection system for optically detecting the displacement of the cantilever. The detection system includes a source for emitting laser light. The observation optical system includes an objective lens opposed to the sample and an eyepiece enabling an observer's ocular observation. A laser shutter is located in an optical path between the objective lens and the eyepiece. The laser shutter has a switch for detecting its open/close operation. A logic circuit computes an output signal from the switch and an output signal from a controller. Based on the result of the computation, an LD switch circuit causes an LD driver to turn the light source on or off.

24 Claims, 3 Drawing Sheets

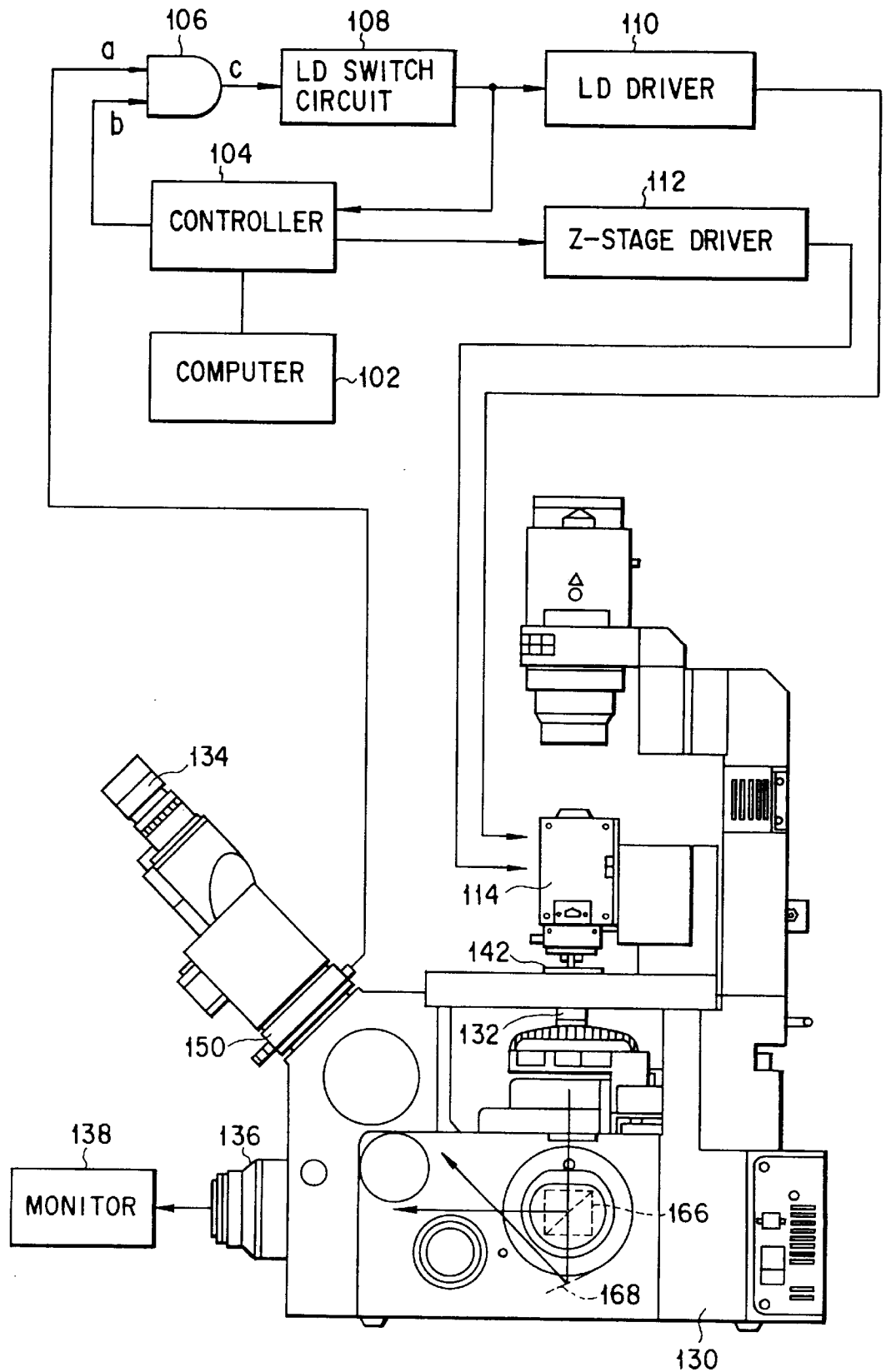
F I G. 1

SCANNING PROBE MICROSCOPE INCORPORATING AN OPTICAL MICROSCOPE

BACKGROUND OF THE INVENTION

1. Field of the Invention

The present invention relates to a scanning probe microscope, and more particularly, to a scanning probe microscope in which laser light is used to detect the displacement of a probe.

2. Description of the Related Art

Recently, observation of fine objects by means of a scanning probe microscope (SPM) has attracted public attention. An atomic force microscope is described as a typical scanning probe microscope in U.S. Pat. No. Re. 33,387. The atomic force microscope is an apparatus in which the surface configuration of a sample is subjected to three-dimensional mapping in a manner such that a feeble force acting between the tip of a pointed probe on the free end of a cantilever and the surface of the sample (in the direction normal to the sample surface) is detected by means of the cantilever.

While the scanning probe microscope enjoys very high resolutions, it is relatively difficult to position the tip of its probe and spots of measurement. Described in "Ultramicroscopy" 42–44, 1992, pp. 1542–1548 is a scanning probe microscope that incorporates an optical microscope for probe positioning, whereby this problem is solved. In this apparatus, a measurement sample and the cantilever are simultaneously observed through a monitor as the probe is positioned.

If the measurement sample is a biological one, some observers may require the cantilever to be positioned under feeble-light observation, such as fluorescent observation. In the feeble-light observation, the quantity of observation light used is so small that it is difficult to observe the sample through a monitor. In this case, therefore, an observer must directly observe the sample with his own eye through an eyepiece.

In many cases, detecting means for the displacement of the cantilever uses laser light, which may possibly meet the observer's eye through the eyepiece. Accordingly, a laser, for use as a source of laser light, must be turned off during the feeble-light observation.

The correct way to carry out feeble-light observation is to look in at the eyepiece after turning off the laser. Otherwise the laser light will meet the observer's eye. There is no problem if the feeble-light observation is carried out after the laser is turned off. It can be easily supposed, however, that the observer will carelessly look in at the eyepiece without turning off the laser or without noticing the failure of the laser to be turned off due to some trouble in the apparatus.

Accordingly, an improvement is required to prevent the laser light from the cantilever displacement detecting means from meeting the observer's eye during direct ocular observation through the eyepiece.

If the laser is suddenly turned off during SPM measurement, moreover, the following problem will arise. During the SPM measurement, the distance or the force of contact between the probe and the measurement sample is controlled in accordance with information from the displacement detecting means, so that the control may possibly become unstable and damage the sample if the laser is turned off unexpectedly.

Thus, there is a demand for an improvement of the apparatus to prevent the measurement sample from being damaged when the laser is turned off suddenly.

SUMMARY OF THE INVENTION

The present invention has been contrived in consideration of these circumstances, and its primary object is to provide a scanning probe microscope that enables an observer to make direct ocular observation through an eyepiece without having his eye met by laser light from cantilever displacement detecting means.

Another object of the invention is to provide a scanning probe microscope incorporating an optical microscope, in which a measurement sample cannot be damaged even when a laser is suddenly turned off during SPM measurement.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows a scanning probe microscope according to an embodiment of the present invention;

DETAILED DESCRIPTION OF THE PREFERRED EMBODIMENTS

Figure 2:
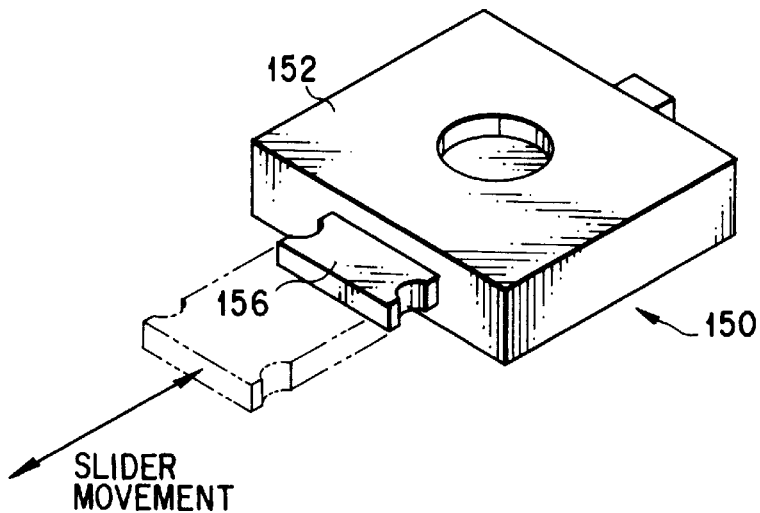
FIG. 2 is a perspective view of a laser shutter shown in FIG. 1.

In a scanning probe microscope according to the present embodiment, as shown in FIG. 1, an SPM measurement unit 114 is incorporated in an inverted optical microscope 130. The microscope 130 comprises an objective lens 132 opposed to a measurement sample 142 from below, an eyepiece 134 through which an observer directly sees an observation image as an optical image with his own eye, and an image pickup device 136, such as a CCD camera, for picking up the observation image as an electrical image. The image picked up by the device 136 is displayed on a monitor 138.

The inverted optical microscope 130 includes means for dividing observation light from the objective lens 132 into two light beams directed toward the eyepiece 134 and the image pickup device 136, individually. More specifically, the dividing means includes a light dividing element 166, such as a half-mirror, which reflects a part of the observation light from the objective lens 132 onto the image pickup device 136, and a mirror 168, which reflects the observation light transmitted through the element 166 onto the eyepiece 134.

Figure 3A:
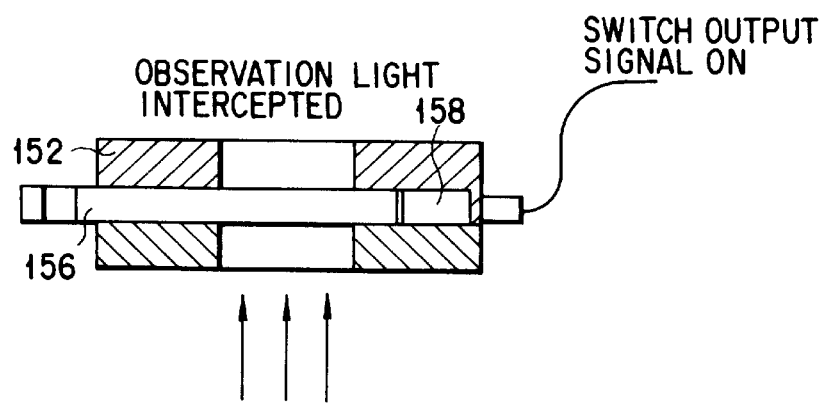
FIG. 3A is a sectional view of the laser shutter of FIG. 2 in its closed state.
Figure 3B:
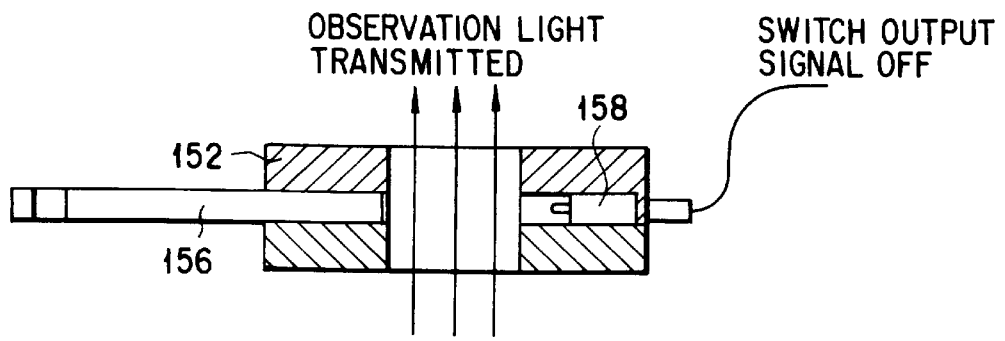
FIG. 3B is a sectional view of the laser shutter of FIG. 2 in its open state.

A laser shutter 150 is located in an observation light path between the objective lens 132 and the eyepiece 134, or more specifically, between the light dividing element 166 and the eyepiece 134. As shown in FIGS. 2, 3A and 3B, the shutter 150 includes a shutter body 152 having a circular through hole and a slider 156 that is slidably attached to the body 152. As the slider 152 moves, the through hole of the shutter body 152 is opened or closed. The laser shutter 150 is provided with a switch 158 that is turned "on" and "off" by the slider 156. The switch 158 delivers a switch output signal "a" in association with the position of the slider 156. The output signal "a" is "on" when a switch pin is pushed in the slider 156, i.e., when the through hole fully closed, as shown in FIG. 3A. The signal "a" is "off" in any other state, e.g., when the through hole is fully open, as shown in FIG. 3B. In other words, the switch 158 detects the full closure of the through hole of the laser shutter 150, and outputs a signal indicative of it. Table 1 below shows the states of the observation light and switch output signal established as the laser shutter 150 is opened and closed.

TABLE 1

| Laser Shutter | Observation Light | Switch Output Signal |
| --- | --- | --- |
| Closed | Intercepted | On |
| Open | Transmitted | Off |

Figure 4:
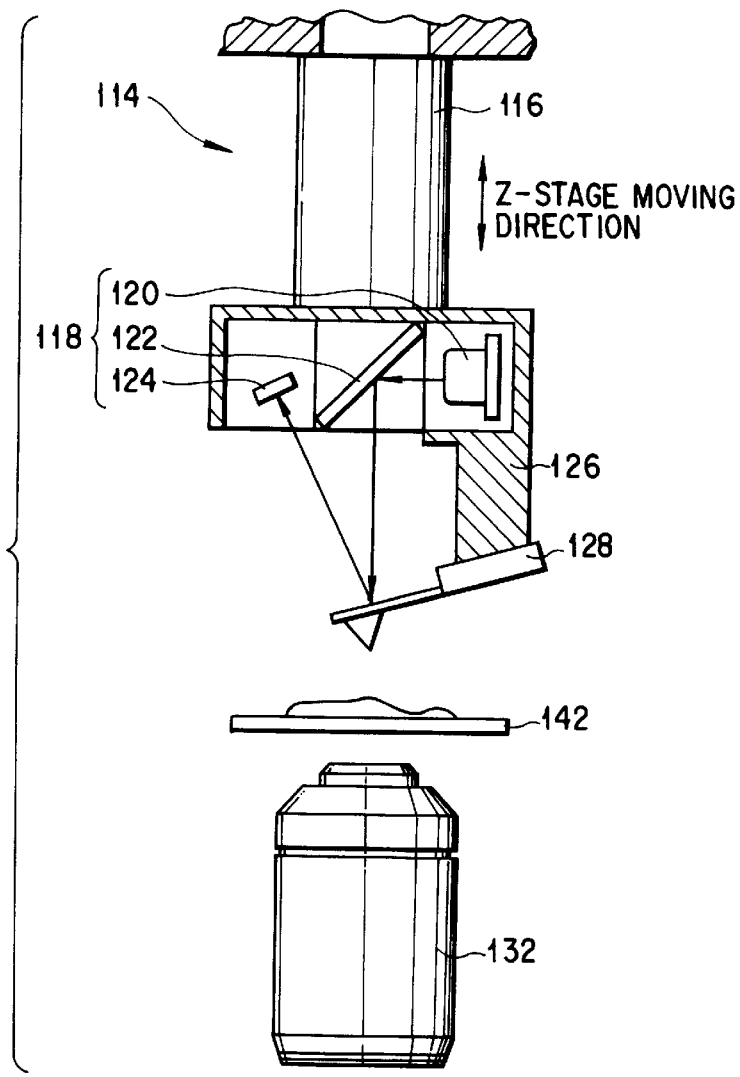
FIG. 4 shows an arrangement of an SPM measurement unit shown in FIG. 1.

As shown in FIG. 4, the SPM measurement unit 114 comprises a beam element having a probe, e.g., in this embodiment, a cantilever 128 having a probe on its free end, a displacement detection system 118 for detecting the displacement of the free end of the cantilever 128, a support member 126 supporting the cantilever 128 and containing the detection system 118, and a Z-stage 116 supporting the support member 126 for movement at least in the Z-direction. Usually, the Z-stage 116 is composed of a cylindrical piezoelectric actuator or a tube scanner as it is called, and also has a scanning function for the XY-direction. The XY-direction scanning function is not an essential condition for the Z-stage 116, and may alternatively be allotted to a stage that holds the measurement sample 142.

The displacement detection system 118 is composed of a laser light source 120 for emitting a laser beam, a dichroic mirror 122 for reflecting the laser beam onto the cantilever 128, and a spot position sensor 124 that receives the reflected beam from the cantilever 128. Based on the position of a spot of the reflected beam from the cantilever 128, the Z-direction displacement of the free end of the cantilever 128, that is, the Z-displacement of the probe, is obtained.

The laser beam applied to the free end of the cantilever 128 is not totally reflected, and is partially transmitted through the measurement sample 142 to be incident upon the objective lens 132. When the observer directly observes the measurement sample 142 through the eyepiece 134, therefore, the laser beam may possibly be focused on and injure the retina of his eye unless the laser light source 120 is off.

Under instructions from a computer 102, a controller 104 delivers a controller output signal "b" for the on/off operation of the laser light source 120.

A logic circuit 106 performs a predetermined logical operation for the switch output signal "a" from the switch 158 attached to the laser shutter 150 and the controller output signal "b" from the controller 104. Based on an output signal "c" from the logic circuit 106, an LD switch circuit 108 supplies an LD driver 110 with an instruction signal for the on/off operation of the laser light source 120. In response to the output signal from the switch circuit 108, the driver 110 turns the light source 120 on or off. Table 2 below shows the relationship between input and output signals of the logic circuit 106.

TABLE 2

| Input Signal | | Output signal |
| --- | --- | --- |
| a | b | c |
| Off | Off | Off |
| On | Off | Off |
| Off | On | Off |
| On | On | On |

Generally, the observation of the measurement sample 142 and relative positioning of the cantilever 128 and the sample 142 are carried out watching the monitor 138. In the case of fluorescent observation, the observation light is so feeble that a high-contrast image cannot be displayed on the monitor 138. In this case, therefore, the laser shutter 150 is opened so that the sample can be viewed directly through the eyepiece 134.

It is a correct way of direct ocular observation through the eyepiece 134 for the observer to open the laser shutter 150 to start the observation after operating the computer 102 to turn off the laser light source 120 lest the laser beam meet his eye. As long as this procedure is securely followed, the laser beam will never meet the observer's eye. It can be easily supposed, however, that the observer will carelessly look in at the eyepiece 134 without turning off the light source 120 or the light source 120 will fail to be turned off due to some trouble in the computer 102 or the controller 104.

The apparatus according to the present embodiment is designed so that the laser light cannot meet the observer's eye even in such a situation. The following is a description of a manipulation for starting the direct ocular observation through the eyepiece and the operation of the apparatus.

Before the observation through the eyepiece is started, the laser shutter 150 is closed, as shown in FIG. 3A. In this state, the observation light is intercepted by the shutter 150, so that the laser light cannot meet the observer's eye even though the laser light source 120 is on.

When the laser shutter 150 is closed, as shown in FIG. 3A, the switch output signal "a" is "on". As seen from Table 2, therefore, the light source 120 is turned on if the controller output signal "b" from the controller 104 is "on".

If the controller output signal "b" from the controller 104 is "off", then the laser light source 120 is already turned off. Accordingly, the laser shutter 150 can be opened to start the observation through the eyepiece 134 without any problem.

If the laser shutter 150 is opened with both the controller output signal "b" from the controller 104 "on" and the laser light source 120 turned on, the switch output signal "a" is switched to "off". As seen from Table 2, therefore, the output signal "c" of the logic circuit 106 is switched to "off", whereupon the light source 120 is turned off.

The controller 104, which continually monitors the output of the LD switch circuit 108, gives a Z-stage driver 112 an instruction to restore the Z-stage 116 to a predetermined length when the output of the circuit 108 is turned off (or when a instruction signal for the switch-off operation of the laser light source 120 is outputted). During the SPM measurement, the Z-stage 116 is stretched in the Z-direction, and the probe on the cantilever 128 is situated close to the measurement sample 142. If the output of the LD switch circuit 108 is turned off during the SPM measurement, the Z-stage 116, having so far been extending in the Z-direction, is restored to its original length under the instruction from the Z-stage driver 112, and the cantilever 128 is moved away from the measurement sample 142 so that the probe on the cantilever 128 and the sample 142 are kept at a predetermined distance from each other. Accordingly, the sample can be prevented from being damaged by unstable control during the SPM measurement.

Thus, even in case the observer carelessly starts the direct ocular observation through the eyepiece 134 without turning off the light source 120 or if the light source 120 fails to be turned off due to any trouble in the computer 102 or the like, the light source 120 can be turned off when the laser shutter 150 is opened, so that there is no possibility of the laser light meeting the observer's eye.

Figure 5A:
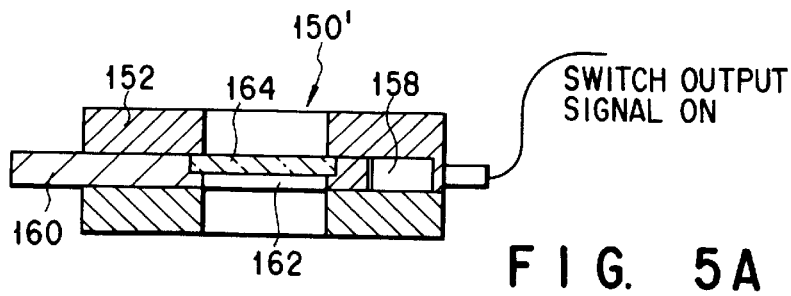
FIG. 5A is a sectional view of another laser shutter in its closed state used in place of the laser shutter of FIG. 2.
Figure 5B:
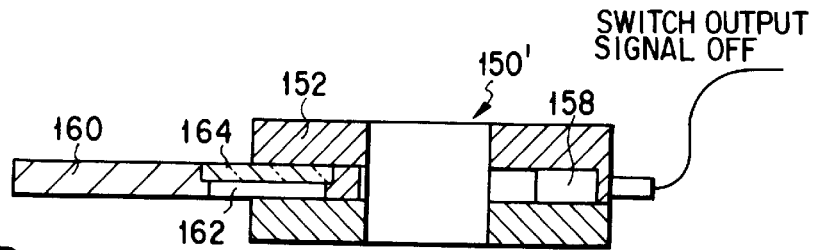
FIG. 5B is a sectional view of the laser shutter of FIG. 5A in its open state.

As shown in FIGS. 5A and 5B, another laser shutter 150' that is used in place of the laser shutter 150 shown in FIG. 2 is very similar to the shutter 150, so that like reference numerals are used to designate like members of the two shutters 150 and 150'. The laser shutter 150' comprises a shutter body 152 and a slider 160 that is slidably attached to the body 152. The slider 160 is provided with an optical filter 164, which closes a circular aperture in the slider 160, thereby intercepting the laser light. The filter 164 has a characteristic such that it transmits light beams with wavelengths shorter than a specific wavelength, which is shorter than the wavelength of the laser light, and intercepts light beams with wavelengths longer than the specific wavelength. As the slider 160 moves, a through hole in the shutter body 152 is opened or closed. When the through hole is closed, the optical filter 164 is situated in the hole.

The on/off operation of the laser light source 120 is controlled in association with the position of the slider 160, just as in the case where the aforesaid laser shutter 150 is used.

When the laser shutter 150' is closed, as shown in FIG. 5A, the optical filter 164 intercepts light beams in a certain wave range that includes the wavelength of the laser light, while it allows the passage of light beams in other wave ranges. Thus, the observation sample can be observed through the eyepiece 134, though its color tone is extraordinary due to the partial interception of the light beams.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning probe microscope incorporating an optical microscope, comprising:

SPM measurement means for making an SPM measurement on a measurement sample, the SPM measurement means including a cantilever having a probe on a free end thereof and displacement detecting means for optically detecting a displacement of the cantilever, the displacement detecting means including a laser light source for emitting laser light;

an optical system for performing optical observation of at least the measurement sample, the optical system including an eyepiece enabling an observer to perform ocular observation;

shutter means for controlling a transmission/interception operation of light directed to the eyepiece from the sample; and means for controlling an on/off operation of the laser light source in response to an open/close operation of the shutter means.

2. A scanning probe microscope according to claim 1, wherein the shutter means includes a through hole permitting passage of light therethrough and a slider for closing the through hole.

3. A scanning probe microscope according to claim 2, wherein the slider comprises an optically opaque member.

4. A scanning probe microscope according to claim 2, wherein the slider includes an optical filter for preventing the passage of light in a certain wave range including a wavelength of the laser light and for allowing the passage of light in other wave ranges, such that the slider closes the through hole with the optical filter.

5. A scanning probe microscope according to claim 2, wherein the control means includes a switch for detecting a full closure of the through hole of the shutter means and for outputting a detection signal indicative of the full closure, and the control means allows the laser light to be turned on only while the switch is outputting the detection signal indicative of the full closure of the through hole.

6. A scanning probe microscope according to claim 5, wherein the displacement detecting means includes a light source driver for turning on the laser light source, and the control means includes a switch circuit for outputting an instruction signal for the on/off operation of the laser light source with reference to the detection signal output by the switch, the light source driver turning the laser light source on and off in accordance with the instruction signal output by the switch circuit.

7. A scanning probe microscope according to claim 6, wherein the SPM measurement means includes a Z-stage means for adjusting a distance between the probe on the cantilever and the measurement sample, and which further comprises a Z-stage driver for driving the Z-stage means, the Z-stage driver being adapted to move the cantilever away from the measurement sample so that the probe on the cantilever and the sample are kept at a predetermined distance from each other when the switch circuit outputs the instruction signal for the on/off operation of the laser light source.

8. A scanning probe microscope according to claim 1, wherein the optical system includes an objective lens opposed to the measurement sample, and the shutter means is located in an optical path between the objective lens and the eyepiece.

9. A scanning probe microscope according to claim 8, wherein the optical system includes light dividing means for dividing the observation light from the objective lens, and the shutter means is located in an optical path between the light dividing means and the eyepiece.

10. A scanning probe microscope incorporating an optical microscope, comprising:

a beam element having a probe, opposed to a measurement sample;

a laser light source for applying a laser light beam onto the beam element;

means for detecting displacement of the beam element by receiving reflected light from the beam element;

an optical system for performing optical observation of the sample, the optical system including an objective lens opposed to the beam element interposing the sample therebetween, and an eyepiece enabling an observer to perform ocular observation; and light interception means for intercepting a portion of the laser light directed to the eyepiece passing through the objective lens;

wherein the light interceptions means includes a through hole permitting passage of light therethrough and a slider for closing the through hole; and wherein the slider includes an optical filter for preventing the passage of light in a certain wave range including a wavelength of the laser light and for allowing the passage of light in other wave ranges, whereby the slider closes the through hole with the filter.

11. A scanning probe microscope incorporating an optical microscope, comprising:

a beam element having a probe, opposed to a measurement sample;

a laser light source for applying a laser light beam onto the beam element;

means for detecting displacement of the beam element by receiving reflected light from the beam element;

an optical system for performing optical observation of the sample, the optical system including an objective lens opposed to the beam element interposing the sample therebetween, and an eyepiece enabling an observer to perform ocular observation; and light interception means for intercepting a portion of the laser light directed to the eyepiece passing through the objective lens;

wherein the light interception means includes a through hole permitting passage of light therethrough and a slider for closing the through hole; and wherein the scanning probe microscope further comprises means for controlling an on/off operation of the laser source in response to an open/close operation of the through hole.

12. A scanning probe microscope incorporating an optical microscope, comprising:

means for making an SPM measurement on a measurement sample, the SPM measurement means including a beam element having a probe and means for optically detecting the displacement of the element, the displacement detecting means including a laser light source for emitting laser light;

an optical system for performing optical observation of at least the measurement sample, the optical system including an eyepiece enabling an observer to perform ocular observation; and light interception means for intercepting light directed to the eyepiece from the measurement sample;

wherein the light interception means comprises shutter means for controlling a transmission/interception operation of the light directed to the eyepiece from the sample;

wherein the shutter means includes a through hole permitting passage of light therethrough and a slider for closing the through hole; and wherein the slider includes an optical filter for preventing the passage of light in a certain wave range including a wavelength of the laser light and for allowing the passage of light in other wave ranges, whereby the slider closes the through hole with the filter.

13. A scanning probe microscope incorporating an optical microscope, comprising:

an SPM measurement unit for making an SPM measurement on a measurement sample, the SPM measurement unit including a cantilever having a probe on a free end thereof and a displacement detection system for optically detecting a displacement of the cantilever, the displacement detection system including a laser light source for emitting laser light;

an optical system for performing optical observation of at least the measurement sample, the optical system including an eyepiece enabling an observer to perform ocular observation;

a shutter for controlling a transmission/interception operation of light directed to the eyepiece from the sample; and a controller for providing a control signal for on/off operation of the laser light source, and a logic circuit for controlling the on/off operation of the laser light source in response to the control signal and an open/close operation of the shutter.

14. A scanning probe microscope according to claim 13, wherein the shutter includes a through hole permitting passage of light therethrough and a slider for closing the through hole.

15. A scanning probe microscope according to claim 14, wherein the slider comprises an optically opaque member.

16. A scanning probe microscope according to claim 14, wherein the slider includes an optical filter for preventing the passage of light in a certain wave range including a wavelength of the laser light and for allowing the passage of light in other wave ranges, such that the slider closes the through hole with the optical filter.

17. A scanning probe microscope according to claim 14, further comprising a switch for detecting a full closure of the through hole of the shutter and for outputting a detection signal indicative of the full closure, and wherein the logic circuit allows the laser light to be turned on only while the switch is outputting the detection signal indicative of the full closure of the through hole.

18. A scanning probe microscope according to claim 17, wherein the displacement detecting system includes a light source driver for turning on the laser light source, and which further comprises a switch circuit for outputting an instruction signal for the on/off operation of the laser light source with reference to a signal output by the logic circuit, the light source driver turning the laser light source on and off in accordance with the instruction signal output by the switch circuit.

19. A scanning probe microscope according to claim 18, wherein the SPM measurement unit includes a Z-stage for adjusting a distance between the probe on the cantilever and the measurement sample, and which further comprises a Z-stage driver for driving the Z-stage, the Z-stage driver being adapted to move the cantilever away from the measurement sample so that the probe on the cantilever and the sample are kept at a predetermined distance from each other when the switch circuit outputs the instruction signal for the on/off operation of the laser light source.

20. A scanning probe microscope according to claim 13, wherein the optical system includes an objective lens opposed to the measurement sample, and the shutter is located in an optical path between the objective lens and the eyepiece.

21. A scanning probe microscope according to claim 20, wherein the optical system includes a light dividing element for dividing the observation light from the objective lens, and the shutter is located in an optical path between the light dividing element and the eyepiece.

22. A scanning probe microscope incorporating an optical microscope, comprising:

- a beam element having a probe, opposed to a measurement sample;
- a laser light source for applying a laser light beam onto the beam element;
- a displacement detection system for detecting displacement of the beam element by receiving reflected light from the beam element;
- an optical system for performing optical observation of the sample, the optical system including an objective lens opposed to the beam element interposing the sample therebetween, and an eyepiece enabling an observer to perform ocular observation; and
- a shutter for intercepting a portion of the laser light directed to the eyepiece passing through the objective lens;
- wherein the shutter includes a through hole permitting passage of light therethrough and a slider for closing the through hole; and
- wherein the slider includes an optical filter for preventing the passage of light in a certain wave range including a wavelength of the laser light and for allowing the passage of light in other wave ranges, whereby the slider closes the through hole with the filter.

23. A scanning probe microscope incorporating an optical microscope, comprising:

- a beam element having a probe, opposed to a measurement sample;
- a laser light source for applying a laser light beam onto the beam element;
- a displacement detection system for detecting displacement of the beam element by receiving reflected light from the beam element;
- an optical system for performing optical observation of the sample, the optical system including an objective lens opposed to the beam element interposing the sample therebetween, and an eyepiece enabling an observer to perform ocular observation; and
- a shutter for intercepting a portion of the laser light directed to the eyepiece passing through the objective lens;
- wherein the shutter includes a through hole permitting passage of light therethrough and a slider for closing the through hole; and
- wherein the scanning probe microscope further comprises a controller for providing a control signal for on/off operation of the laser light source, and a logic circuit for controlling the on/off operation of the laser light source in response to the control signal and an open/close operation of the throughhole.

24. A scanning probe microscope incorporating an optical microscope, comprising:

- an SPM measurement unit for making an SPM measurement on a measurement sample, the SPM measurement unit including a beam element having a probe and a displacement detection system for optically detecting the displacement of the element, the displacement detecting system including a laser light source for emitting laser light;
- an optical system for performing optical observation of at least the measurement sample, the optical system including an eyepiece enabling an observer to perform ocular observation; and
- a shutter for intercepting light directed to the eyepiece from the measurement sample and for controlling a transmission/interception operation of the light directed to the eyepiece from the sample;
- wherein the shutter includes a through hole permitting the passage of light therethrough and a slider for closing the through hole; and
- wherein the slider includes an optical filter for preventing the passage of light in a certain wave range including a wavelength of the laser light and for allowing the passage of light in other wave ranges, whereby the slider closes the through hole with the filter.

* * * * *